June 12, 1956    J. J. O'MALLEY    2,749,772
TRANSMISSION AND CONTROLS
Filed July 19, 1952    4 Sheets-Sheet 1

Inventor
John James O'Malley
By Willits, Helwig & Baillio
Attorneys

June 12, 1956

J. J. O'MALLEY 2,749,772

TRANSMISSION AND CONTROLS

Filed July 19, 1952

Inventor
John James O'Malley
By
Willits, Helmig & Baillio
Attorneys

Inventor
John James O'Malley
By Willits, Helwig & Baillio
Attorneys

United States Patent Office 2,749,772
Patented June 12, 1956

2,749,772

TRANSMISSION AND CONTROLS

John James O'Malley, Detroit, Mich., assignor to General Motors Corporation, Detroit, Mich., a corporation of Delaware Application July 19, 1952, Serial No. 299,855

11 Claims. (Cl. 74—665)

This invention relates to transmissions and particularly to a torque transfer unit and control system for use in conjunction with a primary transmission unit and adapted to provide for shift of gear ratio without interrupting the torque transfer from the primary transmission unit to the output shaft of the torque transfer unit.

Manually shiftable torque transfer units have heretofore been employed for heavy duty applications wherein two wheel or four wheel drive may be selected by the vehicle operator. In the operation of such devices, it has been necessary to retard the vehicle speed and to practically stop vehicle motion to accomplish shift of gear ratio in the torque transfer unit. In order to change gear ratio in such transfer units, the torque path is broken so that no torque can be transferred through the unit during the interval of shift of gear ratio in the unit. By this invention shift of gear ratio in the torque transfer unit may be accomplished under torque loading and without interrupting the torque flow through the torque transfer unit. Thus, shifting of gear ratio in the torque transfer unit may be accomplished without the necessity of retarding the vehicle speed during the shift interval.

An object of this invention is to provide in combination with a primary transmission unit a torque transfer unit driven by the primary transmission unit arranged to provide for shift of gear ratio in the torque transfer unit without interrupting the torque path during the interval in which shifting of gear ratio is accomplished.

A further object of this invention is to provide a torque transfer unit adapted to provide for neutral, and a plurality of drive ratios.

An additional object of this invention is to provide a torque transfer unit adapted to provide for either rear wheel drive or for both rear and front wheel drive.

Still another object of this invention is to provide a torque transfer unit and control system adapted to provide for either direct or gear reduction drive in either rear wheel drive or four wheel drive and arranged to provide for four wheel drive before reduction drive may be accomplished.

These and other objects of this invention will be apparent from the following description and claims in which:

Figure 1:
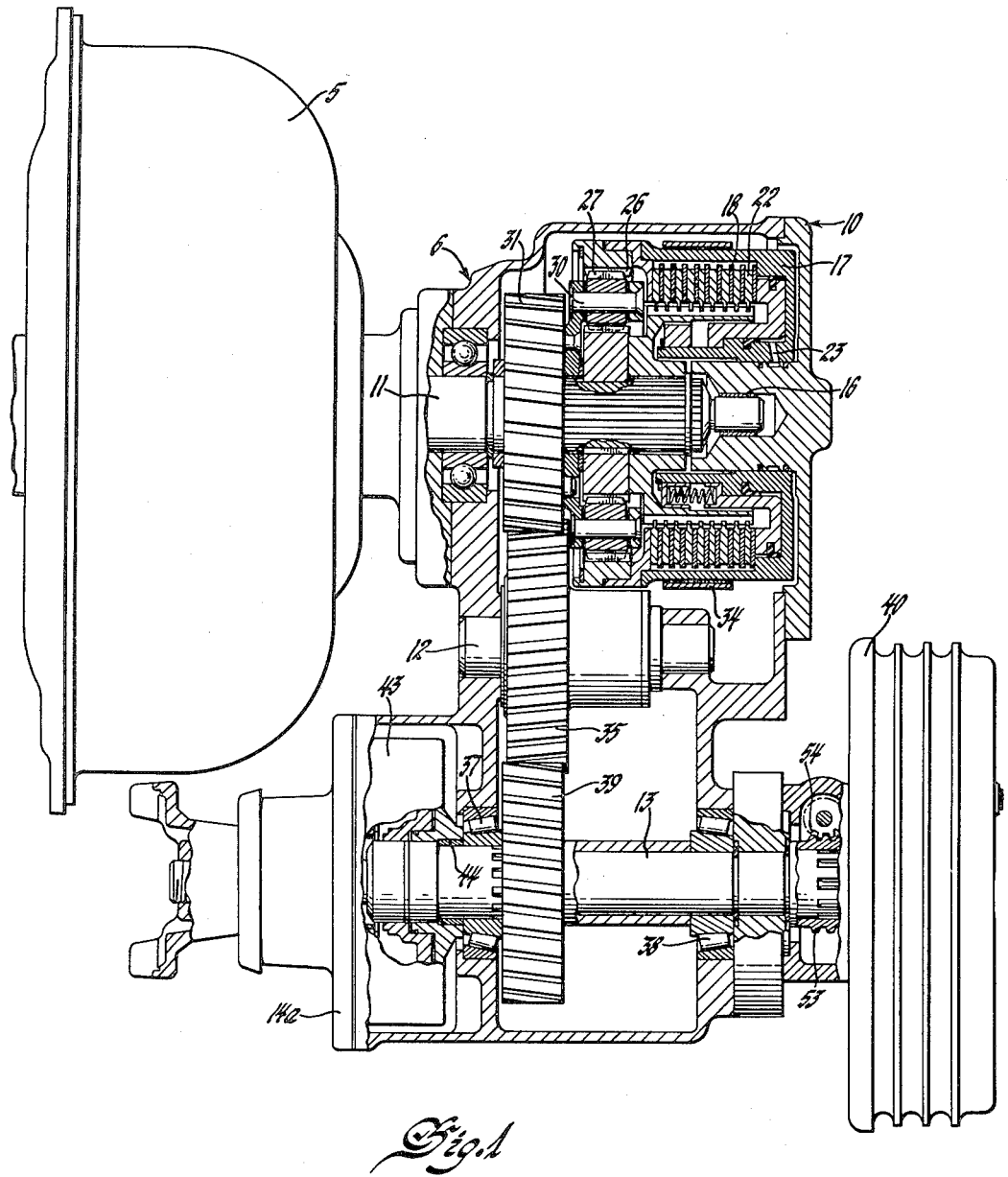
Figure 1 is a schematic view of the torque transfer unit.

Referring to Figure 1, there is shown a schematic diagram of a primary transmission unit 5 arranged to drive a torque transfer unit 10. The primary transfer unit 5 may be a standard slide gear type transmission unit wherein gears are manually selectively engaged for selection of gear ratio, but is preferably an automatic transmission adapted to automatically provide shift of gear ratio. The primary transmission unit is preferably of the type illustrated in the patent to Oliver K. Kelley 2,211,223, filed April 10, 1939, and issued August 13, 1940.

Figure 2:
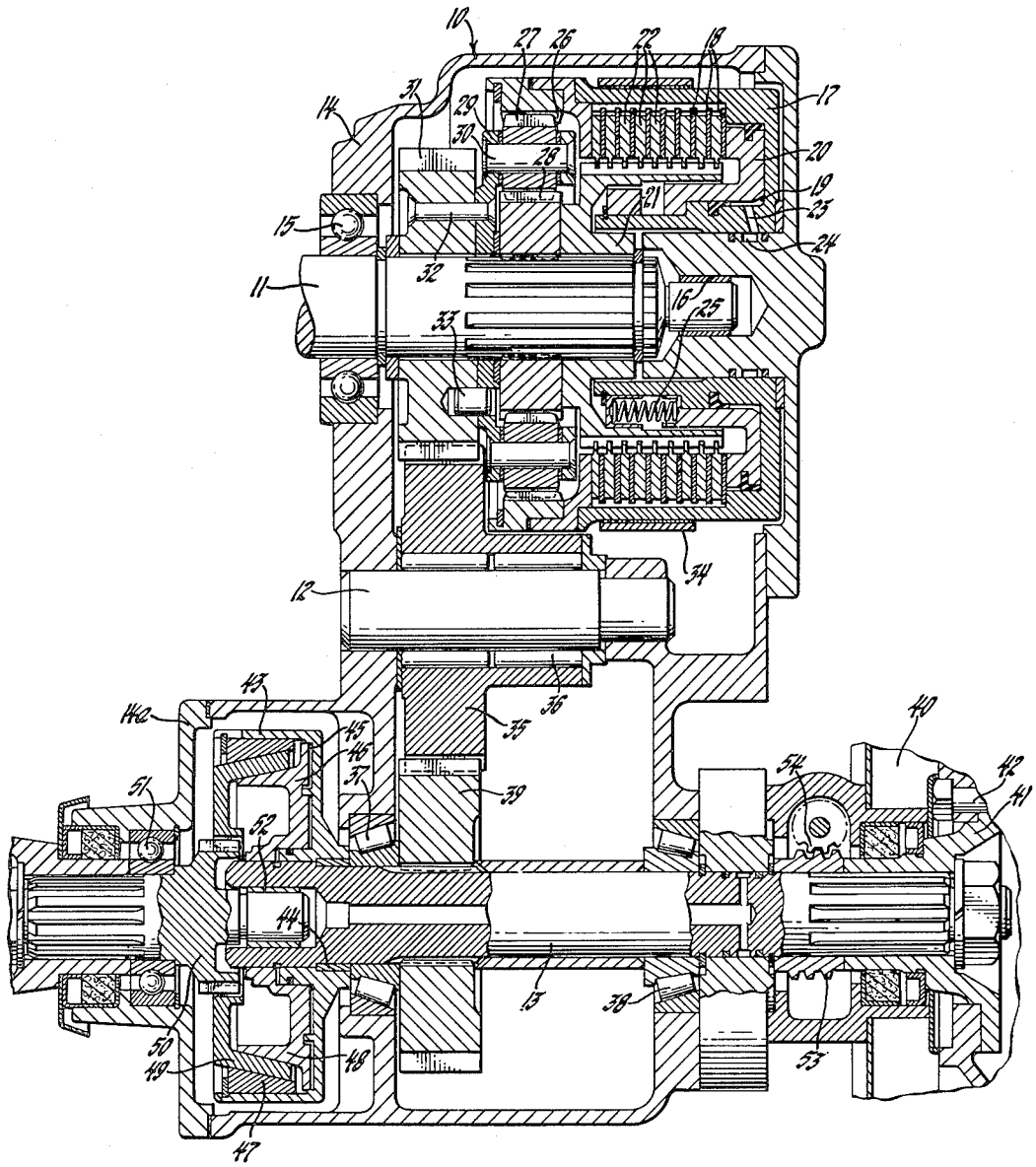
Figure 2 is an enlarged view of the torque transfer unit with parts broken away and in section.

In Figure 2, the torque transfer unit 10 is illustrated in detail, the torque transfer unit being arranged to provide for neutral or no drive, for direct drive of the vehicle rear wheels, for direct drive of both the front and rear wheels, and for reduction drive of both the front and rear wheels. As will be hereafter more fully explained, the control system is arranged to provide for four wheel drive before reduction drive can be selected through the torque transfer unit 10.

Referring to Figure 2, the torque transfer unit 10 is made up of three main shafts 11, 12 and 13 laterally spaced from each other and disposed parallel to each other. Shaft 11, which is the power input shaft of the torque transfer unit, is driven by the primary transmission unit 5 of Figure 1, shaft 11 being rotatably mounted in a casing 14 by means of ball bearings 15 at one side of the casing and being journaled in bearings 16 in the casing 14 at the inner end of the shaft. A clutch drum 17 supported upon casing portion 14 is splined to carry a plurality of clutch plates 18 and is shaped to provide a cylinder space 19 in which a piston 20 is disposed. A clutch hub 21 splined to power input shaft 11 is splined to carry a plurality of clutch plates 22, the plates 18 and 22 being adapted to be engaged through action of piston 20 when fluid pressure is admitted to chamber 19. A passage 23 is provided to admit fluid pressure to chamber 19 from a gland 24 in accordance with the operation of a control system hereafter described. A coil spring 25 acts upon piston 20 to release the clutch plates when fluid pressure is released from chamber 19.

Clutch drum 17 has affixed thereto an annulus or ring gear 26 adapted to engage a planet gear 27, which planet gear 27 in turn meshes with a sun gear 28 splined to and driven by power input shaft 11. While a pair of planet gears 27 are illustrated, it will be readily understood that several, preferably three or four, of such gears may be meshed with ring gear 26 and sun gear 28. A planet carrier 29 supports planet gear 27 by means of a planet pin 30, the planet gear 27 being rotatable about pin 30 as an axis. A torque transfer gear 31 mounted for rotation about shaft 11 is pinned to planet carrier 29 by means of pins 32 and 33 so that gear 31 is driven at the same speed as the speed of rotation of the planet carrier. A band 34 is adapted to be applied to clutch drum 17 for preventing rotation of the drum by means of a hydraulic control system hereafter described. Band 34 and clutch 18—22 are alternately engaged to provide reduction drive or direct drive of gear 31. With band 34 applied to clutch drum 17, ring gear 26 is fixed against rotation so that sun gear 28 drives gear 31 through planet gear 27 at a speed less than that of shaft 11. With clutch 18—22 applied and band 34 released, ring gear 26 is locked to sun gear 28 through shaft 11 so that gear 31 is driven at the same speed as shaft 11.

A countershaft 12 supported upon housing 14 carries a torque transfer gear 35, gear 35 being supported upon bearing 36 disposed between gear 35 and shaft 12. A shaft 13 supported in housing 14 by means of bearings 37 and 38 has splined thereto a gear 39. Gear 35 meshes with gears 31 and 39 to transfer torque from shaft 11 to shaft 13. Shaft 13 extends to the right in Figure 2 and is connected to drive the vehicle rear wheels through any conventional drive system such as a differential joint, not shown. A transmission brake drum 40 of Figure 1 is bolted to a hub 41 by bolts 42 as shown in Figure 2. Hub 41 is splined to shaft 13.

At the left of bearing 37 in Figure 2, a clutch drum 43 is keyed to shaft 13 by key 44 to be driven by shaft 13. Clutch drum 43 is shaped to form a chamber 45 adapted to receive an annular piston 46 and is keyed to a conical drive backing member 47. Piston 46 is shaped to include a conical portion 48 adapted to engage a cone clutch member 49 splined to a front wheel drive shaft 50. When fluid pressure is admitted to chamber 45, piston 46 forces conical clutch member 49 to move laterally upon shaft 50 and to engage conical backing member 47 fixed to clutch drum 43. Front wheel drive shaft 50 is supported in a housing portion 14a by means of a ball bearing 51, and is journaled in one end of shaft 13, there being a bearing 52 for supporting the end of shaft 50 in shaft 13. Shaft 50 may be connected to drive the front wheels by any conventional mechanism such as a universal joint and differential drive, not shown. Shaft 13 may be connected to drive the rear wheels by any similar conventional means, not shown. A gear 53 carried by drum 41 may mesh with a pump drive gear 54 to drive a pump 56 shown in Figure 3.

Figure 3:
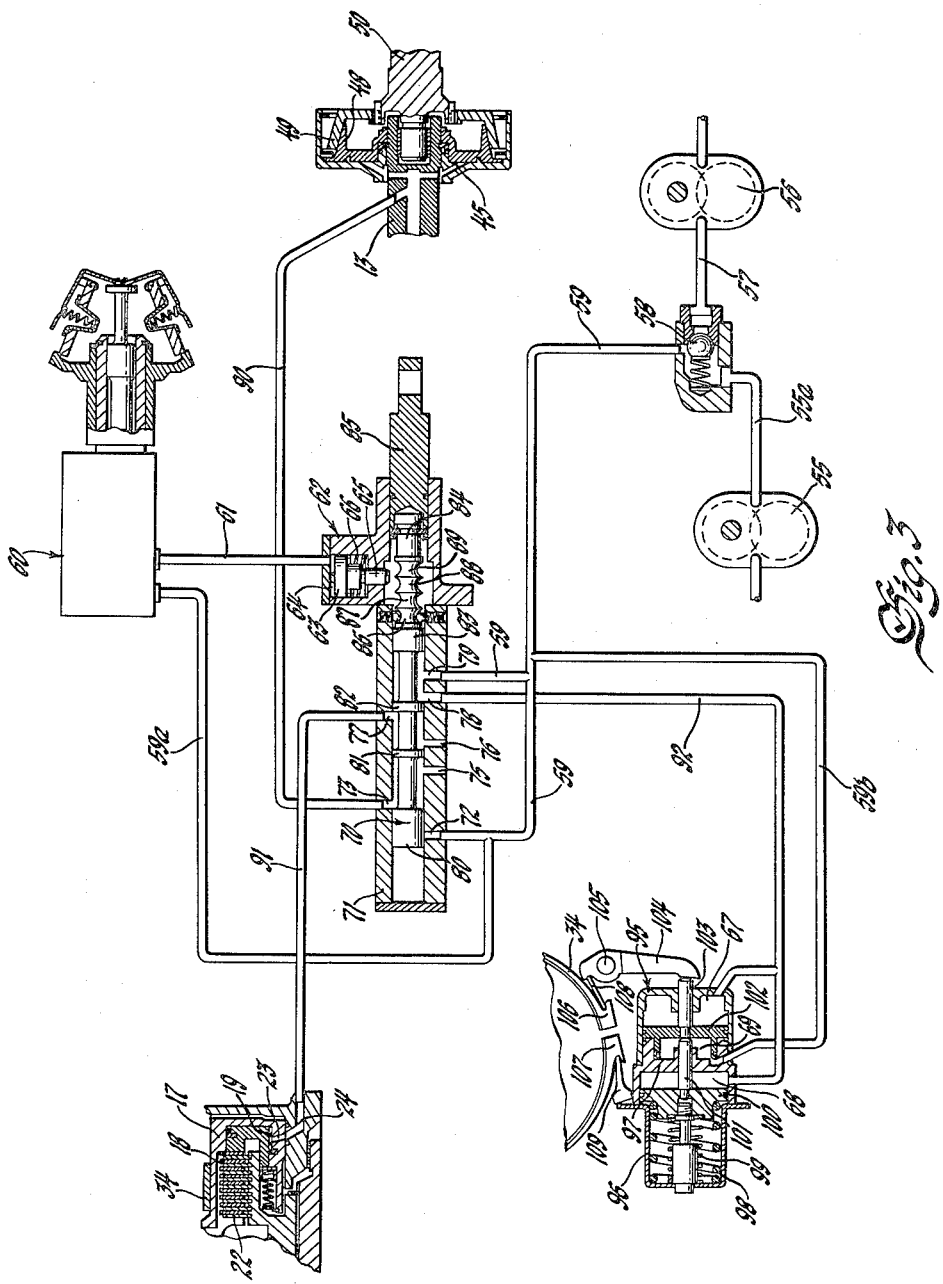
Figure 3 is a schematic diagram of the torque transfer unit control system.

Referring to Figure 3, there is shown a schematic layout of the hydraulic control system for controlling the torque transfer unit. As stated, the transfer unit is adapted to be driven by a hydraulically controlled automatic shift primary transmission such as is shown in United States Letters Patent to Oliver K. Kelley 2,211,223, issued August 13, 1940.

Such transmissions are provided with both engine driven and vehicle driven pumps for supplying control pressure to the primary transmission control system. Pump 56 of Figure 3 may be driven either by the output shaft of the automatic transmission unit or by gear 54 of Figure 2. Governor 60 of Figure 3 may likewise be driven either by the output shaft of the automatic unit or by gear 54 of Figure 3. Such transmissions are also provided with vehicle driven governors for providing a variable pressure to control shift of gear ratio in the primary transmission unit. The supply of pressure for the transfer unit is preferably supplied by the primary transmission unit pumps, but may be supplied by separate pumps if desired. Governor pressure from the primary transmission unit may be utilized to control a shift inhibitor 62 hereafter more fully described to prevent shifting of the transfer unit gear ratio at excessive vehicle speeds.

The engine driven pump 55 and vehicle tailshaft driven pump 56 each supply pressure to a supply passage 59, passage 55a being the discharge passage for pump 55, and passage 57 being the discharge passage for pump 56. A check valve 58 is arranged to prevent the pressure from engine driven pump 55 from discharging through the vehicle speed responsive pump 56 when the vehicle is not in motion. Pump 56 is effective to supply pressure to the system in the event the engine is stalled and the vehicle is being towed to start the engine. Pump 56 may be driven by shaft 11 or shaft 13. A governor 60 is supplied with pressure from passage 59a and delivers a variable pressure which increases in accordance with increase in vehicle speed to a passage 61 leading to a shift inhibitor 62 to prevent shift of gear ratio at excessive vehicle speed. The shift inhibitor 62 is composed of a piston 63 in a chamber 64 having a stem 65 adapted to engage recesses of a manually operable valve 70 when governor pressure in passage 61 is of sufficient magnitude to move the piston against a release spring 66. The governor may be driven by the shaft 11 by any gear 54 of Figure 2.

A manually operable valve 70 may be positioned to select neutral or no drive, direct drive to the rear wheels only, four wheel direct drive, and four wheel reduction drive. The valve 70 is arranged such that four wheel direct drive is accomplished before four wheel reduction drive can be obtained. Shift from two wheel direct drive to four wheel reduction drive can only be accomplished after first establishing four wheel direct drive. This prevents undue strain from being applied to the rear axle and protects the rear axle from breakage due to excess torque application thereto.

Manually operable selector valve 70 is composed of a casing 71 having ports 72, 73, 75, 76, 77, 78 and 79 therein. Ports 72 and 79 are connected to pressure supply passage 59. Port 73 connects to front wheel drive clutch pressure supply passage 90. Ports 85 and 76 exhaust to the transmission sump. Port 77 connects to direct drive clutch pressure supply passage 91. Port 78 connects to reduction drive band release passage 92. Valve 70 is made up of lands 80, 81, 82 and 83 joined by reduced stem sections, the valve having an extension 84 thereon protruding from casing 71 for attachment to an actuator 85 which may be manually controlled from the vehicle steering column by a control linkage (not shown). Extension 84 is provided with four annular recesses 86, 87, 88 and 89 for cooperation with a detent mechanism for yieldably retaining the valve in any given operational position selected by the vehicle driver. The detent mechanism is made up of a pair of ball bearings spring biased to engage in the recesses to assure that the valve will not accidentally move from a selected operative position, and to assure that the valve will assume any given operative position chosen by the vehicle operator.

A servo unit 95 acts to apply band 34 to drum 17 of Figure 2 when the servo is exhausted. The servo unit is made up of a casing 96 having a partition 97 dividing the servo into two sections. A pair of springs 98 and 99 act upon a piston 100 to apply band 34 to clutch drum 17 of Figure 2. A stem 101 fixed to piston 100 extends through partition 97 to contact a second piston 102. Piston 102, in turn, carries a stem 103 extending from the servo housing 96 to contact a rocker lever 104 pivoted for rotation about a shaft 105. Band 34 carries a pair of grooved members 106 and 107 adapted to receive levers 108 and 109. Lever 109 is a reaction lever extending between grooved member 107 and the servo housing 96. Lever 108 extends between grooved member 106 and a groove in lever 104 for transmitting force from lever 104 to the band. In the absence of fluid pressure in chambers 67 and 68 of servo 95, springs 98 and 99 are effective to cause lever 104 to pivot about support shaft 105 to apply the band to drum 17 to prevent rotation of ring gear 26 of Figure 2. This places the torque transfer unit in reduction drive. Thus the vehicle engine may be started by towing the vehicle.

Passage 92, under control of manually operable valve 70 conducts pressure to chambers 67 and 68, such pressure acting upon pistons 102 and 100 to compress springs 98 and 99 and release the band 34. A passage 59b is connected directly to pump pressure supply passage 59 to conduct pressure to chamber 69. Such pressure acts upon piston 102 to assist springs 98 and 99 to apply band 34 to drum 17.

With the manually operable valve positioned for neutral or no drive as illustrated in Figure 3, line pressure from passage 59 is conducted through branch passage 59b to chamber 69 adjacent piston 102, pressure in chamber 69 acting upon piston 102 in assistance to the action of springs 98 and 99 tending to apply band 34 to drum 17. Line pressure from passage 59 is admitted through ports 79 and 78 of valve 70 to passage 92 and is supplied to chambers 68 and 67 of the low band servo to release band 34 from drum 17. The areas of pistons 100 and 102 which are subject to pressure in chambers 68 and 67, respectively, are chosen such that pressure in chambers 68 and 67 will be effective to overcome the effect of springs 98 and 99 and fluid pressure in chamber 69 to release the band 34 when the valve 70 is placed for neutral or no drive operation.

Figure 4:
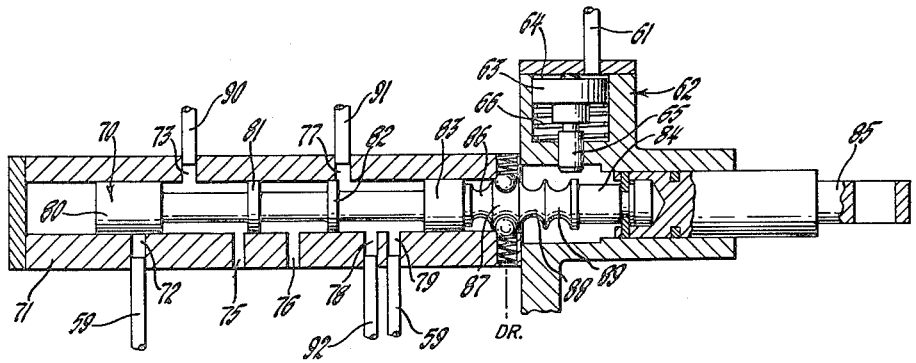
Figure 4 is a schematic diagram of the control system manually operable valve illustrating the valve as positioned to select direct drive of two wheels.

With valve 70 positioned for drive position, as shown in Figure 4, pressure from pressure supply passage 59 is admitted to chamber 19 of clutch 18—22 to apply the clutch. Passage 91 is connected to passage 59 through ports 79 and 77 of valve 70. Passage 91 is connected to gland 24 and passage 23 of Figure 2. At the same time, pressure is admitted to passage 92 through ports 79 and 78 of manual valve 70 to release the band. With clutch 18—22 engaged and band 34 released, the transmission is in direct drive through the rear wheels of the vehicle.

Figure 5:
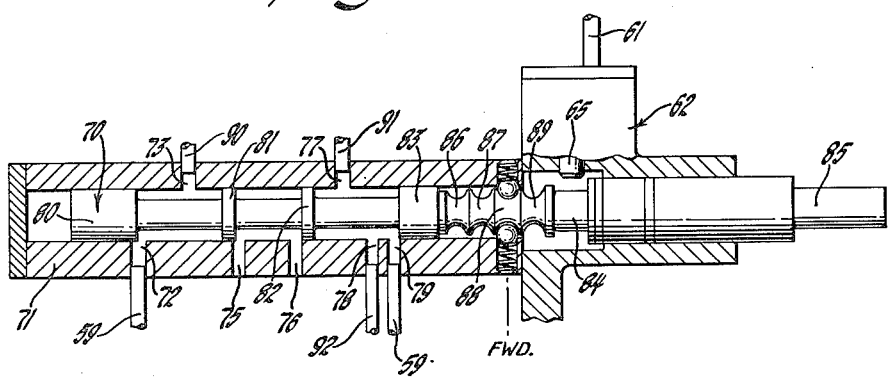
Figure 5 is a schematic view of the control system manually operable valve illustrating the valve as positioned to select direct drive through four wheels.

Further movement of manual valve 70 into the valve casing 71 next establishes four wheel drive by engaging the front wheel drive cone clutch 48—49. Pressure is admitted from passage 59 to front wheel clutch chamber 45 by way of ports 72 and 73 of valve 70 and passage 90. Drive through the transfer unit is direct, clutch 18—22 being applied and band 34 being released. The four wheel direct drive position of valve 70 is shown in Figure 5.

Figure 6:
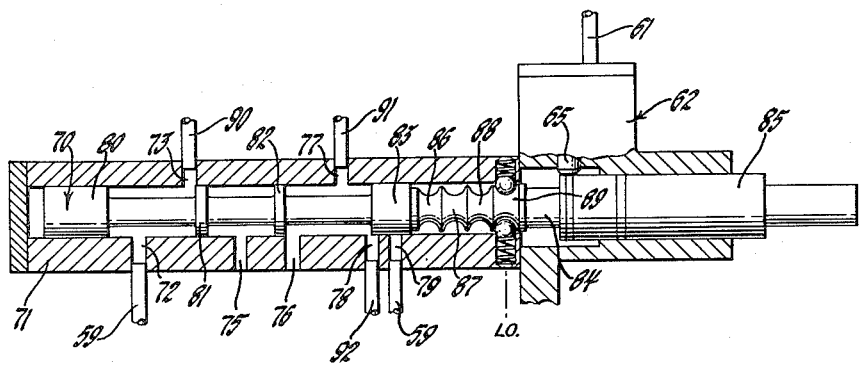
Figure 6 is a schematic diagram of the control system manually operable valve illustrating the valve as positioned for reduction drive through four wheels.

Reduction gearing drive through both front and rear wheels is selected by moving valve 70 into casing 71 to the position shown in Figure 6. When so positioned, front wheel drive clutch 48—49 is engaged by admitting pressure through ports 72 and 73 of valve 70 to passage 90. Pressure in passage 91 and direct drive clutch 18—22 is exhausted to sump through ports 77 and 76 of valve 70. Pressure in passage 92 is exhausted to sump through ports 78 and 76 of valve 70. Springs 98 and 99 and fluid pressure in chamber 69 thereupon apply the reduction drive servo to clamp band 34 on drum 17.

It will be apparent from the foregoing description that there has been provided a torque transfer unit particularly adapted to permit shift of gear ratio under torque without braking the torque flow during the shift interval. Push start of the vehicle engine may be accomplished by reason of the fact that springs 98 and 99 apply the band 34 to drum 17 in the absence of fluid pressure. Thus, with a stalled engine, torque may be transmitted from the vehicle wheels to the engine through the torque transfer unit. In operating the control valve 70, it is impossible to select reduction drive without first selecting four wheel drive. This protects the vehicle rear axle against excess strain as might occur were the transfer unit to be shifted into two wheel reduction drive with the primary transmission unit in reduction drive.

While torque transfer units, per se, are old in the art, the particular planetary gearing arrangement and the control system are believed to incorporate novel features permitting shift of gear ratio without torque interruption, selection of two wheel or four wheel drive without torque interruption, and mandatory selection of four wheel drive prior to selection of reduction drive.

While the invention has been disclosed and described in detail in a particular embodiment thereof, it will be understood that various changes and modifications thereof may be made without departing from the spirit and scope of the invention as set forth in the appended claims.

I claim:

1. A torque transfer unit comprising a power input shaft, a first power output shaft, gearing connecting said shafts, a second output shaft, a clutch intermediate said first and second output shafts, a planetary gearing unit driven by said power input shaft for driving said gearing connecting said power input and said first power output shafts, a brake and clutch means operable to determine the drive condition of said planetary gearing unit, fluid pressure responsive servo members associated with said brake and each of said clutches, respectively, a fluid pressure source, a valve casing, a valve disposed in said casing for controlling said servo units, said valve means being effective to select neutral or no drive, direct drive through one of said output shafts, direct drive through both of said output shafts and reduction drive through both of said output shafts in the order named as said valve is moved in said casing.

2. A torque transfer unit comprising a power input shaft, a first power output shaft, gearing connecting said shafts, a second power output shaft, a clutch intermediate said power output shafts, a planetary gearing unit for driving said gearing connecting said power input and said first power output shaft, said planetary gearing unit having control means including a clutch and a brake, fluid pressure responsive servo members for controlling said brake and said clutches, respectively, a fluid pressure source, and a manually operable valve for selecting the drive condition of said torque transfer unit, said valve having a first position effective to release said brake and both of said clutches, said valve having a second operative position effective to apply said planetary unit clutch and to release said brake and said output shaft clutch, said valve having a third operative position effective to release said brake and to apply both of said clutches, and said valve having a fourth operative position effective to release said planetary unit clutch and to apply said brake and said output shaft clutch.

3. A torque transfer unit comprising a power input shaft, a power output shaft, drive means connecting said shafts, a planetary gearing unit driven by said power input shaft for driving said drive means connecting said shafts, said planetary gearing unit having controlling means including a clutch and a brake, fluid pressure responsive servo units for controlling said clutch and brake, respectively, a fluid pressure source, valve means for controlling the drive ratio of said planetary gearing unit, said brake actuating servo including a plurality of control chambers, a passage connecting one of said chambers to said fluid pressure source for actuating said brake, said passage also being connected to said valve means, a passage connecting other of said brake servo control chambers to said valve means, a passage connecting said clutch servo to said valve means, said valve means being effective in one operative position to connect a pair of said brake servo control chambers to said source and effective in said operative position to connect said clutch control chamber to exhaust, said valve means being effective in a second operative position to connect both said pair of brake servo control chambers and said clutch control chamber to said fluid pressure source, and said valve means being effective in a third operative position to connect both said pair of brake servo control chambers and said clutch control chamber to exhaust for establishing different drive conditions through said planetary gearing unit.

4. A torque transfer unit comprising a power input shaft, a power output shaft, gearing connecting said shafts, a planetary gearing unit for driving said gearing, a brake and a clutch in said planetary gearing unit, fluid pressure responsive servo units for controlling said clutch and brake respectively, said brake servo unit having a plurality of control chambers, a fluid pressure source, a valve for controlling the drive ratio of said planetary gearing unit, a passage connecting one of said brake servo control chambers to said fluid pressure source and also connected to said valve, a passage connecting another of said brake servo control chambers to said valve, a control chamber for said clutch servo, a passage connecting said clutch servo control chamber to said valve, an exhaust port in said valve, said valve being effective in one operative position to connect said clutch servo control chambers to said exhaust port and to connect one of said brake servo control chambers to said fluid pressure source, said valve being effective in a second position to connect one of said brake servo control chambers and said clutch control chamber to said fluid pressure source, and said valve being effective in a third position to connect both said one brake servo control chamber and said clutch control chamber to said exhaust port.

5. A torque transfer unit comprising a power input shaft, a first power output shaft, gearing connecting said shafts, a second power output shaft, a planetary gearing unit having controlling means including a clutch and a brake, a clutch between said first and second power output shafts, fluid pressure responsive servo members for controlling said clutches and brake, respectively, a fluid pressure source, a control valve, a first control chamber in said brake servo connected directly to said fluid pressure source, a second control chamber in said brake servo connected to said valve, said valve having a first operative position effective to connect said second brake servo control chamber to said fluid pressure source and to connect both of said clutches to exhaust, said valve having a second operative position effective to connect said second brake servo control chamber and said planetary unit clutch to said fluid pressure source and to connect said output clutch servo to exhaust, said valve having a third operative position effective to connect second brake servo control chamber and both of said clutch servos to said fluid pressure source, and said valve having a fourth operative position effective to connect said second brake servo control chamber and said planetary unit clutch servo to exhaust and to connect said output shaft clutch servo to said fluid pressure source.

6. A torque transfer unit comprising a power input shaft, a first power output shaft, gearing connecting said shafts, a second power output shaft, a planetary gearing unit including a clutch and a brake, a clutch between said first and second power output shafts, fluid pressure responsive servo members for controlling said clutches and brake, respectively, a fluid pressure source, a control valve, first and second control chambers in said brake servo, passage means connecting said first brake servo control chamber and said valve to said fluid pressure source, a brake release passage connecting said second brake servo unit chamber to said valve, a clutch apply passage connecting said planetary gearing unit clutch to said valve, a clutch apply passage connecting said output shaft clutch to said valve, first and second exhaust ports in said valve, said valve having a first operative position effective to connect said brake release passage to said fluid pressure source and to connect said clutch apply passages to said exhaust ports, respectively, said valve having a second operative position effective to connect said brake release passage and said planetary unit clutch apply passage to said fluid pressure source and to connect said output shaft clutch to one of said exhaust ports, said valve having a third operative position effective to connect said brake release passage and both of said clutch apply passages to said fluid pressure source, and said valve having a fourth operative position effective to connect said brake release passage and said planetary unit clutch apply passage to a second of said exhaust ports and to connect said output shaft clutch apply passage to said fluid pressure source.

7. A torque transfer unit comprising a power input shaft, a power output shaft, a first gear on said input shaft rotatable with respect to said drive shaft, a sun gear fixed to said drive shaft, a planet carrier fixed to said first gear, a ring gear, planet gears supported upon said carrier and meshing with said sun and ring gears, a brake operable to brake said ring gear against rotation, a clutch operable to clutch said sun gear to said ring gear, a gear fixed to said output shaft, a gear intermediate said first gear and said output shaft gear in mesh therewith, a fluid pressure responsive servo member for actuating said brake, a fluid pressure responsive servo member for actuating said clutch, a fluid pressure source, and a valve for controlling said servo members, said valve being effective in one position thereof to exhaust fluid pressure from both of said servos to establish neutral or no drive operation, said valve being effective in a second position to direct fluid pressure to said brake servo to establish reduction drive, and said valve being effective in a third position to direct fluid pressure to said clutch servo to establish direct drive.

8. A torque transfer unit comprising a power input shaft, a plurality of output shafts, gearing connecting said input and output shafts, a clutch between said output shafts for directly connecting the same, a planetary gear unit interposed between said input and output shafts including an input member, an output member and a reaction member, a clutch for directly connecting two of said members to provide direct drive through said planetary unit, a brake for said reaction member to provide reduction drive through said unit when said brake is applied, fluid pressure actuated means for controlling actuation of said clutches and brake, a source of fluid pressure, a valve member controlling communication between said source and said means, said valve member permitting application of said brake by said means only if said output shaft clutch is engaged.

9. A torque transfer unit comprising an input shaft, output shafts, gearing connecting said shafts including a planetary gear unit having an input element, output element and reaction element, a clutch for connecting two of said elements to provide a direct drive through said unit, a brake for said reaction member to provide a different gear ratio in said unit, a clutch for alternately connecting or disconnecting said output shafts, fluid pressure responsive servos for controlling said clutches and brake, a source of fluid pressure connected to said servos, a valve member having a plurality of positions controlling communication between said source and selective ones of said servos, one of said valve positions being effective to permit said different gear ratio to be established in said planetary gear unit only if said output shafts are connected to rotate in unison.

10. A transmission comprising an input shaft, output shafts, gearing connecting said shafts including a planetary gear unit having input, output and reaction members, a clutch for connecting two of said members to provide a direct drive through said unit, a brake for said reaction member to provide a different gear ratio drive through said unit, clutch means to connect said output shafts together, a source of fluid pressure, fluid actuated means to actuate said clutches and brake, fluid controlling means connecting said source and said fluid actuated means having a plurality of positions, one position being effective to cause engagement of said clutches and release of said brake to provide a direct drive from said input shaft to both of said output shafts.

11. A transmission as claimed in claim 10, wherein said fluid controlling means has another position effective to cause engagement of said planetary unit clutch and disengagement of said brake and output shaft clutch to provide a direct drive from said input shaft to one of said output shafts.

References Cited in the file of this patent

UNITED STATES PATENTS

| | | |
|---|---|---|
| 1,298,956 | Johnson | Apr. 1, 1919 |
| 2,223,716 | Bojesen | Dec. 3, 1940 |
| 2,353,905 | Kelley | July 18, 1944 |
| 2,415,758 | Peterson et al. | Feb. 11, 1947 |
| 2,435,633 | Newton | Feb. 10, 1948 |
| 2,507,051 | Roberts | May 9, 1950 |
| 2,557,421 | Evernden | June 19, 1951 |
| 2,583,556 | Fleischel | Jan. 29, 1952 |
| 2,617,257 | Douglas | Nov. 11, 1952 |